United States Patent [19]

Van Ness

[11] Patent Number: 4,665,395

[45] Date of Patent: May 12, 1987

[54] AUTOMATIC ACCESS CONTROL SYSTEM FOR VEHICLES

[76] Inventor: Bradford O. Van Ness, 6511 E. Lincoln Dr., Paradise Valley, Ariz. 85253

[21] Appl. No.: 681,902

[22] Filed: Dec. 14, 1984

[51] Int. Cl.[4] .......... H04Q 7/00

[52] U.S. Cl. .......... 340/825.31; 340/51; 340/928

[58] Field of Search .......... 340/825.31, 825.54, 340/51, 928; 455/56, 41

[56] References Cited

U.S. PATENT DOCUMENTS

| | | | |
|---|---|---|---|
| 3,231,854 | 1/1966 | Gran | 340/928 |
| 4,087,753 | 5/1978 | Paul | 455/41 |
| 4,263,945 | 4/1981 | Van Ness | 141/98 |
| 4,303,904 | 12/1981 | Chasek | 340/51 |
| 4,325,146 | 4/1982 | Lennington | 340/928 |
| 4,338,587 | 7/1982 | Chiappetti | 340/928 |
| 4,398,172 | 8/1983 | Carroll et al. | 340/825.54 |

FOREIGN PATENT DOCUMENTS

| | | | |
|---|---|---|---|
| 2455317 | 12/1980 | France | 340/51 |

*Primary Examiner*—Donald J. Yusko
*Attorney, Agent, or Firm*—Warren F. B. Lindsley

[57] ABSTRACT

An automatic vehicular access control system for use by various government, business and private operations having a need to control the entrance of vehicles to their grounds or facilities. The system comprises a coded transmitter mounted in each authorized vehicle, a receiver located near each controlled entry, a microcomputer employed for system control, and a transmitter programmer employed for the coding of individual transmitters. The system employs a number of safeguards to insure the integrity and security of the system and it operates in a totally automatic mode without human intervention or manipulation.

4 Claims, 4 Drawing Figures

AUTOMATIC ACCESS CONTROL SYSTEM FOR VEHICLES

BACKGROUND OF THE INVENTION

The proprietors of various types of government facilities, businesses and private properties find it necessary or desirable to limit vehicular access to their grounds or buildings. For reasons of security or for other purposes, only authorized vehicles are permitted to enter at a given gate or to pass through some restricted area.

An automatic detection and control system may be advantageously employed to provide this form of security. Such an automatic system may serve a fleet of vehicles owned by an operation and might, in addition to restricting entry, provide an instant record of the specific vehicles present on the grounds or in a security-sensitive area. In residential applications the system might grant immediate access to residents while holding visitors for screening prior to entry. At a hospital such a system might be employed to signal the arrival, presence or departure of a physician's vehicle, thereby indicating the presence or absence of the physician himself.

Such an automatic access control system should ideally provide rapid or instantaneous identification and should deliver data relative to entering vehicles in a form that may be readily processed to control the entry gates or alarms or to generate permanent records of system activity. The degree of manual intervention required (e.g. the use of keys, coded cards, etc.) should be minimized, and the system should be designed to prevent or discourage tampering with or circumvention of its intended operation.

DESCRIPTION OF THE PRIOR ART

U.S. Pat. No. 4,263,945 discloses an automatic fuel dispensing control system intended for use in serving a fleet of vehicles or equipment requiring no operator action. A fueling receiver mounted in the fuel dispenser, a fueling transmitter mounted in each authorized vehicle, and a transmitter programmer comprise the system. Effective system security is afforded through the elimination of any requirement for keys, coded cards or the like.

Although this patent is directed to automatic fuel dispensing control, it does not disclose or teach the automatic access control system of this disclosure employing, inter alia, a system controlled by a particular code generated by an approaching vehicle.

SUMMARY OF THE INVENTION

In accordance with the invention claimed, an improved access control system is provided for use in restricting and recording the entry of vehicles to a given facility or sensitive area.

It is, therefore, one object of the present invention to provide an automatic system for the control of vehicular access to an area or facility.

Another object of the invention is to provide a system of a type that is responsive to an identification code generated by an authorized vehicle.

A further object of the invention is to provide through the use of various such identification codes a flexible system response wherein the action taken by the system is controlled by the particular code that is generated by the approaching vehicle.

A still further object of the invention is to incorporate in such a system a high degree of protection against intervention or tampering which might otherwise circumvent the operation and the security of the access control system.

A still further object of the invention is to incorporate in such a system a capability for making available a printed record of system activity.

A still further object of the invention is to incorporate in such a system the necessary alarms and actuators which are to be responsive to the coded signals received from approaching vehicles.

A still further object of the invention is to provide such a system in a form not requiring any type of manual manipulation on the part of the driver of an authorized vehicle during the process of being granted access to the facility.

Further objects and advantages of the invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described with reference to the accompanying drawing, in which.

DESCRIPTION OF THE PREFERRED EMBODIMENT

Figure 1:
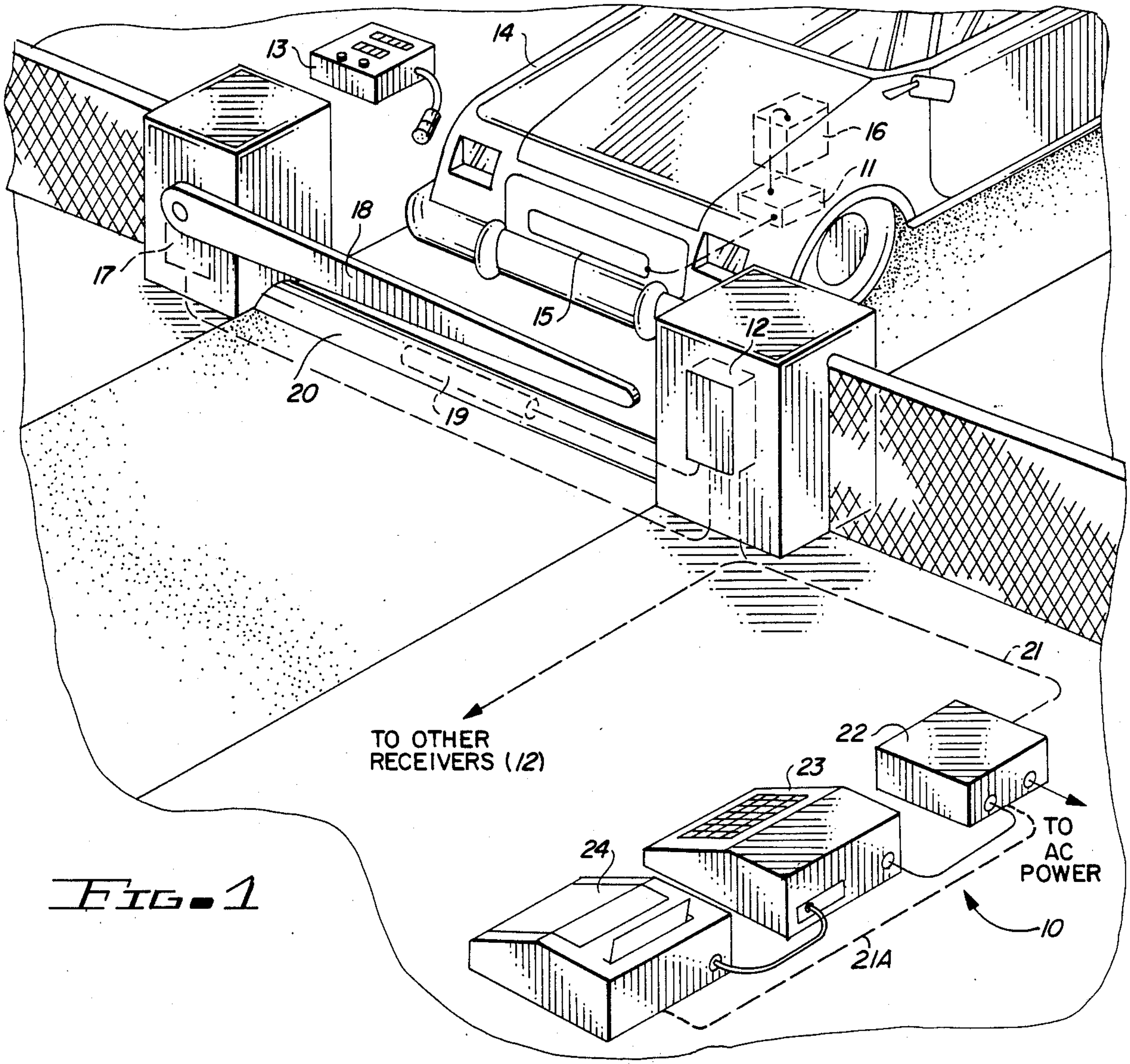
FIG. 1 is a perspective drawing showing the elements of the automatic access control system of the invention.

Referring more particularly to the drawing by characters of reference, FIG. 1 discloses an access control system 10 comprising an access control transmitter 11, an access control receiver 12 and an access control programmer 13. A transmitter 11 is mounted within the body of each vehicle 14 which has been qualified to use the features of system 10. The transmitter 11 is connected by an electrical cable to an antenna 15 located on the front of the vehicle and typically comprising the license plate or substitute metal plate insulated from the frame and body of vehicle 14. The transmitter is also connected to the vehicle battery 16 to derive operating power. The receiver 12 is typically mounted within or close to the access control mechanism 17 shown in this figure typically as a machine to electrically raise or lower barrier gate 18 and is electrically connected thereto to activate the mechanism functions. Signals radiating from the vehicle antenna 15 impinge upon receiving antenna 19 typically buried in the center of the roadway under a speed control "bump" 20. The receiving antenna 19 is connected to receiver 12 which processes the received data and dispatches it via conductors 21 to an interface device 22. Conductors 21 are common to all other receivers installed at a given site so that all such receivers interface with the same device 22. Interface device 22 is coupled to a microcomputer 23 which controls the system response and activates the recording process involving a printer 24. The interface 22 and microcomputer 23 are typically located in an office area and service one or many access points. Signals from microcomputer 23, passing through interface 22 back to receivers 12 remotely control the function of the access mechanisms 17 and 18.

Transmitter 11 is a small radio transmitter that operates at a radio frequency of relatively long wavelengths to penetrate without appreciable attenuation all expected accumulations of ice, snow and dirt covering the antenna 15. The low frequency also reduces directivity so that no critical orientation, other than distance, is required of the receiving device. The radiated power level is intentionally low so that the receiving range is restricted to less than a normal vehicle length between the transmitter antenna 15 and receiving antenna 19. Interference is thus prevented from other transmitters in a line of vehicles. The low power requirement also permits continuous operation from the vehicle power source for long periods of time when the vehicle is not in use.

The transmitter output consists of a radio frequency signal modulated in a digital manner by a continuous, repeated message coded with the following data:

- A syncronization code to identify the start of each repeated message;
- A user control code to authorize access to only those sites that are operated or under the control of a specific user group;
- A vehicle identification code of sufficient character length to specify individually all vehicles included within a given user group;
- A facility code to limit vehicle access to a specific single site among several operated or under control of a specific user group;
- A zone control code to limit vehicle access to one or more specific zones within a facility;
- A security or parity check code to insure accurate reception of the above data prior to the initiation of a system response.

All of the foregoing codes are programmed into an electronic memory incorporated within the transmitter unit at the time the transmitter is installed in a vehicle by means of the programmer unit 13 which plugs into the transmitter 11 for a brief period of time to accomplish this action. No pre-selection of transmitter units for coding is necessary at the factory for different user groups but alternate transmitter frequencies may be factory installed to provide additional security between different user groups.

The programmable feature permits alteration of the coded data as necessary, for example, when a transmitter is transferred from one vehicle to another. Transmitter units are thus prevented from becoming obsolete when the original host vehicle is removed from service.

The primary operating power for the transmitter unit is normally derived from the vehicle electrical system, but any direct current supply of adequate voltage may be used. The power required by the unit is sufficiently low that it may be connected directly to a vehicle battery at all times without causing an appreciable loss of charge over an extended interval during which the normal charging system is not in operation. This primary operating power is supplemented by an internal energy storage element capable of maintaining the contents of the memory for a period of over 36 hours in the event of a failure or disconnection of the primary power source. This supplemental energy source is activated only when the unit is physically mounted on a vehicle. The unit is thus prevented from unintentionally transmitting when in storage or in shipment prior to or between installations. Furthermore, the pre-coded information will not be retained in the transmitter unit if it is removed from the host vehicle.

The transmitter programmer unit 13 is employed to store the appropriate data in the transmitter memory at the time the transmitter is installed on a vehicle. Manually controlled switches are provided on the programmer to permit the setting of the various codes, including the vehicle identification code, the facility code and the zone access code. Additional internal means not readily accessible to the user are preset at the factory for entry of the user control code. Codes for synchronization and transmission security checks are automatically generated within the unit.

To program a transmitter unit the user follows a prescribed routine. He first sets the vehicle identification code, the facility code, and the zone access code using the accessible switches. He then connects the programmer to the transmitter by means of a plug on a short cable and activates the programmer by means of a push button. When a visual indicator signals the completion of the coding cycle, the button is released and the programmer is disconnected from the transmitter.

Under normal conditions each transmitter is programmed only once for any one vehicle. The programming is preferably performed by a responsible individual associated with the user group who has control of the security of the programmer unit.

Each vehicle access control point associated with a specific facility is equipped with an access control receiver or, in the case of separate entrance and exit configurations, with two access control receivers. The receiver antenna 19 is preferably positioned in the center of the roadway in close proximity to the gate or other entry-restricting device so that a vehicle must approach closely to effect the transfer of signal sufficient to activate the system. The antenna 19 should be buried under the roadway surface for protection or under a "speed bump" that also restricts vehicles from moving through the passage at a high rate of speed once access has been granted. The antenna connects to the receiver 12 by means of a small coaxial cable fabricated as part of antenna 19.

Electronic circuitry within the receiver 12 performs the following operations: It amplifies the radio frequency signal from a nearby access control transmitter; it demodulates the signal to extract the encoded digital message; it controls the gain of an integral amplifier to maintain an undistorted signal level over the intended range between the receiver antenna and the vehicle transmitter antenna; it incorporates low-pass filtering to remove all high-frequency noise contamination of the signal; it incorporates a threshold device to squelch low-level signals originating outside the normal or intended range; it performs signal level conversion as needed to interface with subsequent logic devices; it tests the bit structure of the received data for parameters that identify the signal as one emulating from a system transmitter and not from random interference; it separates the logic "0" and "1" levels from the demodulated signal for further processing; it detects the synchronization code to locate the starting point of each message; it tests the security check code for the proper value to determine if bits were added or lost from each received message; it stores the data contents of each message received having correct bit structure, synchronization code and check code; it transmits onto a bidirectional, multiplexed data signal line 21 all such messages for further processing in microcomputer 23; it accepts all messages addressed to itself from microcomputer 23 and performs output control functions such as gate mechanism activation or signal light/alarm indicators in response to these messages.

In addition, the receiver accepts inputs from other vehicle presence detectors, such as metal sensors or photoelectric devices. These means are employed to ensure that a vehicle has safely cleared a gate or other passage-restricting device before the device is restored to the blocking mode. They are also employed to effect direction sensing so that control activation will occur only if a vehicle is on the proper side of the passage restricting device. In addition, they can sense the vehicle direction so that an entrance or exit code may be sent to the microcomputer 23 for the logging in and logging out of vehicles or their drivers to a controlled access area.

Microcomputer 23 performs system control functions including, but not limited to, file search for the valid user code and facility code, file search for a matching zone access code, and file search for valid or invalid I.D. codes. These codes are received from a transmitter within range and passed from the receiver 12 over connecting cable 21. In addition, the microcomputer may determine whether the specific vehicle may pass the access control point according to the time of day, day of the week or during holidays or plant shutdowns. Once the microcomputer program has determined the validity or non-validity of a specific vehicle awaiting passage, it returns a signal coded with the address of the originating receiver and a valid or non-valid response. This return message is then decoded in the addressed receiver 12. If the response is valid, a mechanism is activated to permit passage; if it is not, an alarm signal is activated signifying that passage is denied. The microcomputer 23 is typically located in a nearby indoor area either under direct supervision of a responsible individual or in a secure auxiliary housing accessible, at intervals, to a responsible individual.

Microcomputer 23 is also capable of supplying data to an attached printer 24. Such data may constitute a continuous log by date and time of system activity including a record of all vehicle codes processed. Alternatively it might record only those messages that were received with one or more invalid code elements. The microcomputer further contains provisions, not shown in FIG. 1, to activate an alarm signal as a warning to a responsible individual in the area that a passage attempt is in progress with one or more invalid code elements.

Microcomputer 23 is additionally capable of storing messages in a nonvolatile memory for periodic batch output over an attached telephone or other digital communication link to some distant point for further processing and/or logging.

Interface unit 22 provides signal level conversion as required for the matching of receiver and microcomputer signal input and output ports. These signals flow in both directions over a single wire pair of cable 21 during the communication of receivers 12 with microcomputer 23. Unit 22 also contains the power source used to operate the microcomputer 23 and all receivers 12. The power source is typically a low-voltage storage battery on float charge from normal power lines. Additional wires in cable 21 distribute this power source to each receiver.

In the special case of a single access control point per site, the receiver 12 may consist of only the radio-frequency amplifier, demodulator, gain control, filtering, squelch and logic level shifting functions with the other receiver functions performed within microcomputer 23. This is possible in this situation where the microcomputer is dedicated to only the one receiver rather than two or more.

Figure 2:
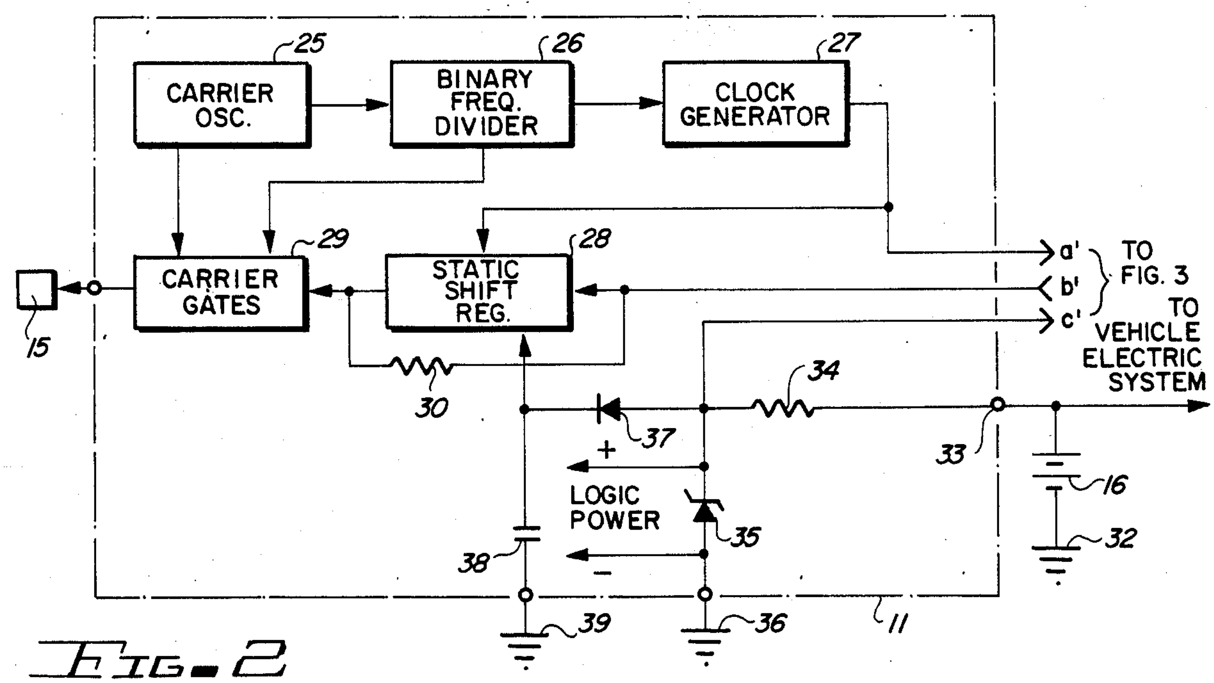
FIG. 2 is a functional block diagram of an access control transmitter which is an element of the access control system.
Figure 3:
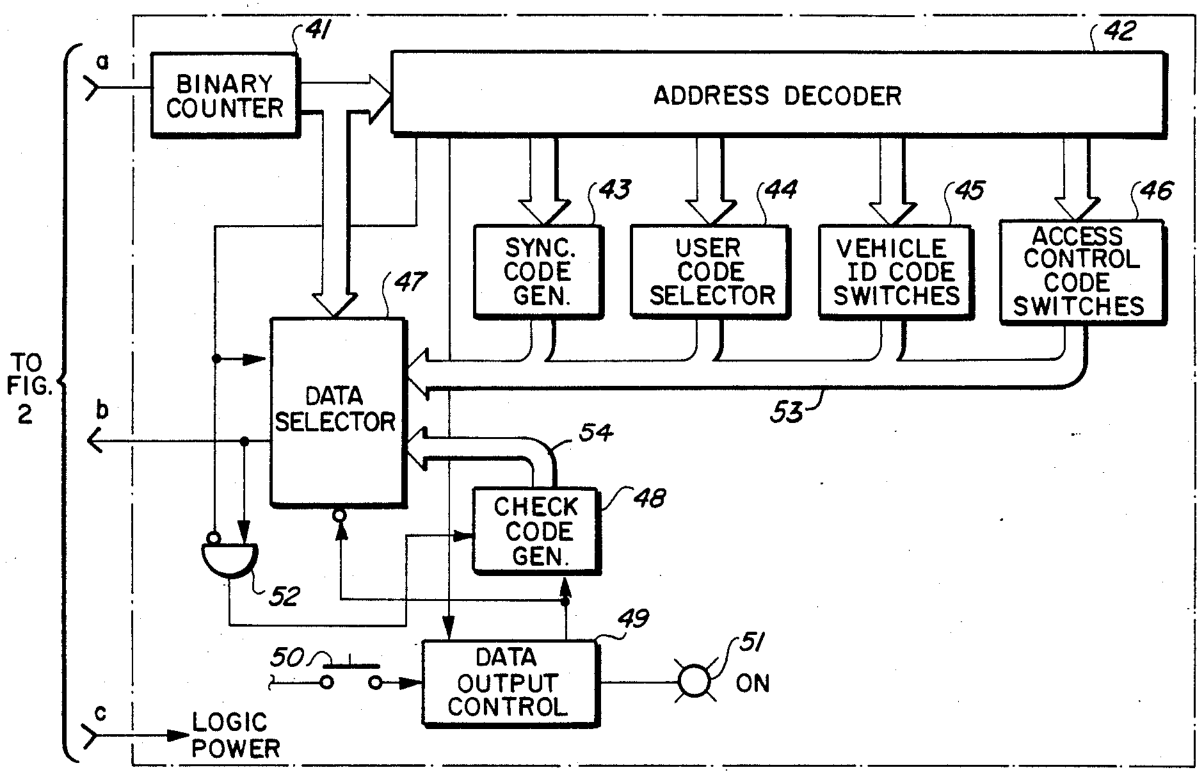
FIG. 3 is a functional block diagram of an access control transmitter programmer which is another element of the control system.
Figure 4:
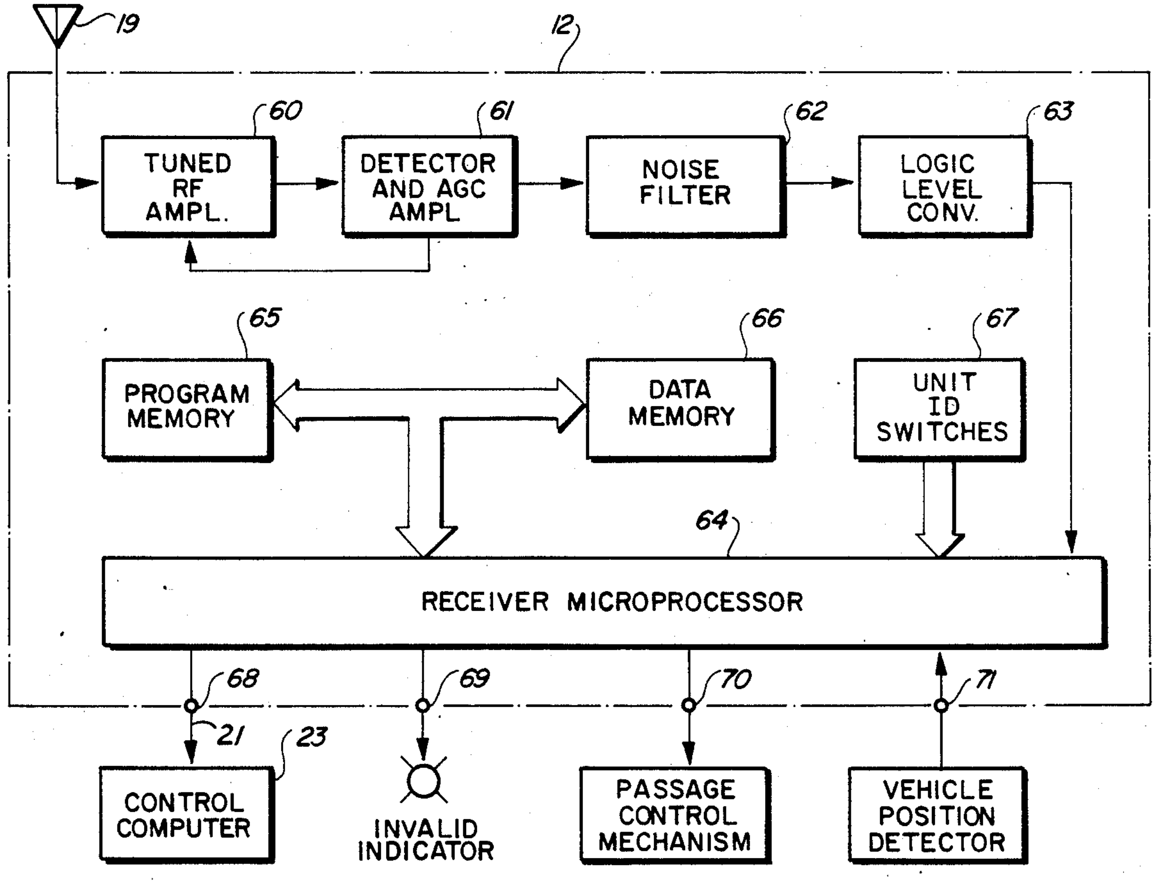
FIG. 4 is a functional block diagram of an access control system receiver which is yet another element of the control system of the invention.

The organizations of the individual elements of the system including the transmitter 11, the transmitter programmer 13 and the receiver 12 are illustrated by the block diagrams in FIGS. 2, 3 and 4 respectively.

The access control transmitter 11 as shown in FIG. 2 comprises a carrier oscillator 25, a binary frequency divider 26, a clock generator 27, a static shift register 28, carrier gates 29 and an external antenna plate or device 15.

The carrier oscillator 25 generates a stable radio frequency carrier for delivery to the carrier gates 29 and to the binary frequency divider 26.

Divider 26 produces sub-harmonics of the carrier frequency. A first sub-harmonic thus generated is utilized by the carrier gates 29 for the generation of a self-clocking bit pattern of keyed RF carrier for delivery to the antenna plate 15; a second sub-harmonic is utilized to produce short clock pulses in clock generator 27.

The output of clock generator 27 is utilized to shift data stored in bit-serial form in the static shift register 28 and is also available on output a′ for use by the transmitter programmer.

Data stored in the static shift register 28 is shifted out through the carrier gates 29 in synchronism with the first sub-harmonic delivered by frequency divider 26. The coded intelligence from register 28 is thus dispatched as an RF message radiated from antenna 15. A feedback resistor 30 connected from the output of register 28 back to the input of the same register circulates the data within the register continuously with each clock pulse unless input line b′ from an attached programmer forces the register input to a different bit value for the storage of new data.

Power is supplied to the transmitter circuits from the vehicle battery 16 through terminal 33 and current limiting resistor 34 with returns through common grounds 32, 36 and 39. Zener diode 35 regulates the voltage applied to all logic circuits within the transmitter.

Diode 37 permits energy storage capacitor 38 to charge to nearly the same potential as zener diode 35. The capacitor voltage is applied as logic power to static shift register 28. If the main battery 16 is disconnected for any reason, all RF and clock pulse generation will cease but the contents of register 28 are preserved for a considerate period of time by the energy stored in capacitor 38. Diode 37 prevents capacitor 38 from discharging back into the other logic circuits and into the vehicle electrical system. Restoration of power from battery 32 before the capacitor 38 fully discharges will start all other transmitter functions with the original precoded data intact and no reprogramming required.

The use of separate ground connections 36 and 39 by means of mounting feet causes the energy storage path of capacitor 38 to be broken if the transmitter is physically removed from the vehicle frame ground. This action causes the data in register 28 to be altered into some random pattern when power is again applied, thus inhibiting the retention of a valid code in a transmitter during the transfer of the transmitter to another vehicle.

The fueling transmitter programmer 13 as shown in FIG. 3 comprises a binary counter 41, an address decoder 42, a sync code generator 43, a user code selector 44, vehicle I.D. code switches 45, access control code switches 46, a data selector 47, a check code generator 48 and a data output control 49.

When programmer 13 is connected to a transmitter 11 by means of terminals a, b and c of the programmer plug to a', b' and c' respectively of the transmitter socket, power is connected to the programmer logic circuits and clock pulses received at terminal a cause binary counter 41 to sequence through all combinations of output values, each bit constituting a sub-harmonic of the clock frequency.

One such sub-harmonic output of counter 41 is used in address decoder 42 to generate a sequence of single bit outputs, each representing one character of coded data. As counter 41 cycles continuously from zero through its full count with the programmer connected to a transmitter, the outputs of the address decoder 42 progress through all combinations in order, then repeating the same order over and over. One output character serves as an enable/disable signal to the data output control 49, the next two outputs to the sync code generator 43. A first set of outputs addresses the user code selector 44, a second set addresses the vehicle I.D. code switches 45 and a third set, the access control code switches 46. The final output enables the data selector 47 and the check code generator input gate 52.

The sync code generator 43 supplies a fixed bit pattern in the data message to establish a known starting point of the data stream for subsequent reception, demodulation and interpretation.

The user code selector 44 supplies a variable bit pattern three characters in length in the data message that is preset at the factory for each system user group or owner, and is unique to that particular user group or owner.

The vehicle I.D. code switches supply a variable bit pattern several characters in length that may be set by the operator of the programmer by means of identified switches on the external surface of the programmer.

The access control code switches supply a variable bit pattern of one to several characters in length that may be set by the operator of the programmer by means of identified switches on the external surface of the programmer for the facility code and zone access code desired.

All of the above bit patterns are directed to the data selector 47 by means of a common 4-bit bus 53. The data selector is normally inhibited in function by a control line from the data output control 49. When in this state, output connection b is open-circuited within the data selector and thus supplies no input to shift register 28 of the transmitter.

When the operator of the programmer presses the RUN pushbutton 50, logic within the data output control 49 awaits the enable/disable signal from the address decoder 42 then cycles to an ON state when this signal occurs. One output of the data output control is then directed to the data selector to remove the inhibit during the ON state; a second output is directed to the check code generator 48 to remove a reset against that logic and a third output activates the ON indicator 51 signifying to the operator that programming is in progress.

Removal of the inhibit against the data selector now causes its output on terminal b and connected terminal b' of transmitter 11 to follow the bit output of selector 47 rather than the output signal of register 28 as fed back from the register input by resistor 30. The data selector uses a second set of sub-harmonics from the binary counter 51 to sequence through each of the four lines of bus 53 for the derivation of the single bit output pattern on terminal b which is now being clocked into transmitter register 28 at the same rate.

This process of serializing all characters in sequence as a single bit stream continues until the last access control switch has been read out at terminal b. Output b is also directed to the check code generator 48 to produce a unique code which is employed in the access control receiver 12 to verify that all other data bits in a message are correct.

At the end of the programmer message, the final output from the address decoder causes the data selector to switch from the original 4-bit data bus 53 to the 4-bit output bus 54 of the check code generator 48 and to inhibit by means of gate 52 other inputs to the check code generator while those same bits are being delivered to terminal b.

The address decoder now starts to repeat the character sequence with enable/disable signal to the data output control 49 which now disables and sequences to the OFF state; the inhibit is reapplied to the data selector, the check code generator is reset for the next message and the ON indicator is extinguished to signify completion of the programming sequence.

It may be seen, therefore, that one depression of the RUN pushbutton on the programmer forces a single, synchronized, message into the transmitter shift register which replaces any other data originally contained therein and then permits the register to resume the circulation function to retain the new data so long as external energy is applied from capacitor 38. Once the programming cycle is complete, the unit may be disconnected from the transmitter. The programmer switch settings may then be altered to program another transmitter.

The access control receiver 12 as shown in the block diagram of FIG. 4 comprises a receiving antenna 19, a tuned RF amplifier 60, a detector and automatic gain control amplifier 61, a noise filter 62, a logic level converter 63 and a receiver microprocessor 64 with associated program memory 65 and data memory 66.

The signal from transmitter 11 received at antenna 19 is amplified by RF amplifier 60 and demodulated by detector and automatic gain control amplifier 61 which feeds signal back to the RF amplifier to compensate for variable signal strengths resulting from changing distances between the transmitter antenna 15 mounted on the vehicle and the receiver antenna 19 located in the roadway. Impulse noise picked up by antenna 19 which may produce false digital signals is removed by noise filter 62.

The logic level converter 63 translates and shapes the filtered demodulated signals into full-voltage "ones" and "zeros" for processing by the microprocessor 64. Converter 63 also incorporates threshold discrimination to insure an adequate signal-to-noise ratio at antenna 19 before data can be processed further.

The receiver microprocessor 64 utilizes one part of the program stored in program memory 65 to perform the following functions in the indicated order on the data coupled from the logic level converter 63:

1. It tests the received data input for correct bit patterns for each bit in the message and rejects any bit not adhering to the prescribed pattern within specified limits;

2. It determines the binary "one" or "zero" value of each received bit having an acceptable bit pattern;

3. It assembles the received bits into message characters and stores the characters temporarily into data memory 66;

4. It tests the assembled characters as received for the sync code pattern and loops until a valid sync code pattern is detected;

5. It then tests the check code character for proper value, rejecting any message with an incorrect value and accepting the first message with correct sync and check code values;

6. It then freezes the acceptable message in data memory 66.

Receiver microprocessor 64 then ignores additional signals on the received data input and jumps to a second part of the program stored in program memory 65 to perform in the indicated order the following functions on the acceptable message stored in data memory 66:

1. It assembles a linking message containing the value of the receiver unit address as set on Unit I.D. switches 67 plus the characters of the received message representing the user code, the vehicle code and the access control code;

2. It transmits this linking message via terminal 68 and conductors 21 to the system control microcomputer 23;

3. It awaits a return message from microcomputer 23 on terminal 68 addressed to the specific unit I.D., confirming or denying the validity of the received message data following a check against the system files stored in microcomputer 23;

4. It activates the invalid alarm output on terminal 69 if the return message indicates an invalid vehicle at the access point and returns to the receiver input and linking cycle to search for a subsequent valid condition;

5. It activates the valid control output on terminal 70 if the message indicates a valid vehicle at the access point to permit passage of the vehicle through the location.

Receiver microprocessor 64 following activation of the valid output on terminal 70, jumps to a third part of the program stored in program memory 65 to perform the following functions on the received data:

1. It searches as before for correct sync codes and check codes;

2. As long as correct messages are being received, a software timer with a predetermined period is kept in a reset state;

3. It tests each new correct message against the value stored at the time a valid confirmation was received.

4. If the timer "runs out" signifying that the vehicle has passed through the access control point and its transmitter signal has disappeared, the valid control output on terminal 70 will be turned OFF to close the access passage mechanism against traffic flow;

5. If a new signal with correct sync and check code is received during the "run out" period of the timer but with a vehicle I.D. code that does not match the previous stored value, the valid control output on terminal 70 will be immediately turned OFF as this condition signifies a second vehicle closely following the first with possible intent of using the first to gain illegal access before being restricted by the passage mechanism;

6. If an optional input on terminal 71 is activated by means of an auxiliary vehicle detector, such as a photoelectric arrangement or a buried sensing loop, the valid control output on terminal 70 will be immediately turned OFF as this condition signifies that the vehicle has cleared the passage control mechanism.

The vehicle detector input at terminal 71 may consist of two separate signals, one from an auxiliary detector on each side of the passage control mechanism. This dual input is processed as part of the first section of the program to add to the linking message a bit of information signifying the direction from which the vehicle approached the access control point. This additional information is utilized by the system microprocessor in a manner to be described.

The same software timer is used in the event that all confirmation messages returned to the receiver provide only a continuous invalid condition and the invalid alarm output at terminal 69 remains ON. When the offending vehicle leaves the area of the receiving antenna 19 and the correct sync code and check code is lot, the timer is allowed to "run out" and turn OFF terminal 69. Recognition of the vehicle as valid once output 69 has been turned on will effect an immediate transfer of the ON control output from terminal 69 to terminal 70.

A complete and effective automatic vehicle access control system is thus provided which, without human intervention, determines whether a given vehicle is authorized to enter a specific controlled area, effects the operation of the passage control mechanism in response thereto and records the identities of all vehicles granted access in or out of the controlled area while also recording the attempted entry of similarly-equipped but unauthorized vehicles.

It should be noted that the access control system for vehicles may be modified to eliminate the separate microcomputer 23 and still function to provide most of the disclosed functions. As shown in dash lines in FIG. 1, the interface unit 22 may be directly connected to printer 24 through conductor 21A with any functions of microcomputer 23 needed being assumed by the receiver microprocessor 64 of receiver 12. The security functions of verification of valid user code, verification of valid zone access code and verification of valid day of the week codes provided by microcomputer 23 will be eliminated from this modification.

This simplified version also will not perform a file search for valid or non-valid vehicle I.D. codes nor the store and forward functions normally performed by the separate microcomputer 23, as heretofore described. The simplified version will provide one-way data output flow through the interface unit 22 directly to printer 24 via cable 21A. The ability of attaching multiple receivers 12 to the same data pair in cable 21 is retained.

Although but a single embodiment of the invention has been illustrated and described, it will be apparent to those skilled in the art that various changes and modifications may be made therein without departing from the spirit of the invention or from the scope of the appended claims.

What is claimed is:

1. An access control system for vehicles comprising:

an access control transmitter for mounting on a vehicle and operable at a predetermined radio frequency, said transmitter comprising a transmitting antenna which radiates modulated RF signals to an access control receiver, a programmable means for storing multiple digital input data comprising a message, and means including a carrier oscillator for selectively transmitting signals comprising said message through said transmitting antenna to an access control receiver, said message comprising vehicle identification and access restrictions of the vehicle on which said transmitter is mounted, said signals of said transmitter being modulated in a digital manner in a repeating message, a transmitter programmer for storing in said programmable means a message comprising a vehicle identification code, an access control code and a user code, an access control receiver for mounting in the vicinity of a passage control mechanism, said receiver comprising an antenna for receiving signals comprising a message transmitted by said transmitter, a demodulator for extracting the encoded digital information in said message, means for storing the data content of the message received, means for checking the message against parameters of correct bit and message structure and rejecting from storage all data received having an incorrect structure, means for checking the data content of the message against stored information, preventing vehicle passage of all those furnishing messages containing incorrect user's code, facility code or zone identification, generating said access control code by failure to provide an access control code signal for all vehicles furnishing a message containing a correct user's code, facility code or zone identification, a passage control mechanism activated upon receipt of said access control code signal from said receiver, and means for determining vehicle direction with respect to the passage control mechanism.

2. The access control system set forth in claim 1 wherein:

said antenna of said receiver is mounted in the vehicle roadway in close proximity to said transmitter antenna mounted on the vehicle when the vehicle is positioned close to said passage control mechanism.

3. The access control system set forth in claim 1 wherein:

said transmitting antenna of said transmitter comprises the license plate of the vehicle on which said transmitter is mounted.

4. The access control system set forth in claim 1 in further combination with:

capacitor means within said transmitter capable of maintaining said message in a memory of said transmitter for a period of time if the electrical system of the associated vehicle fails.

* * * * *